United States Patent [19]
Fitzpatrick et al.

[11] Patent Number: 5,099,800
[45] Date of Patent: Mar. 31, 1992

[54] DOG MUZZLE APPARATUS

[76] Inventors: Alvin M. Fitzpatrick, RR #3, Sterling, Ill. 61081; Robert L. Corbin, 205 N. Campbell, Polo, Ill. 61064

[21] Appl. No.: 682,338
[22] Filed: Apr. 9, 1991
[51] Int. Cl.⁵ .............................................. A01K 25/00
[52] U.S. Cl. ...................................................... 119/130
[58] Field of Search ............... 119/129, 130, 131, 133, 119/29, 29.5, 96, 103; 54/80

[56] References Cited

U.S. PATENT DOCUMENTS

| | | | |
|---|---|---|---|
| 1,362,505 | 12/1920 | Pierce | 119/96 |
| 2,187,461 | 1/1940 | Mott | 119/131 |
| 2,534,727 | 12/1950 | Moyle | 119/29 |
| 3,126,869 | 3/1964 | Young et al. | 119/130 X |
| 3,173,401 | 3/1965 | Lupo, Sr. | 119/133 |
| 4,745,882 | 5/1988 | Yarnall, Sr. et al. | 119/29 |

FOREIGN PATENT DOCUMENTS 0024458 of 1896 United Kingdom ................ 119/133

Primary Examiner—Robert P. Swiatek
Assistant Examiner—Todd E. Manahan
Attorney, Agent, or Firm—Leon Gilden

[57] ABSTRACT

A muzzle apparatus is arranged for mounting to a muzzle portion of an associated canine, wherein the muzzle apparatus contains an ultra sound receiver, as well as a scent saturated gauze member mounted about the muzzle apparatus to enhance excitement and activity in an associated dog such as utilized in racing. A modification of the invention includes further structure for securing a dog in a limited ambulatory manner.

4 Claims, 4 Drawing Sheets

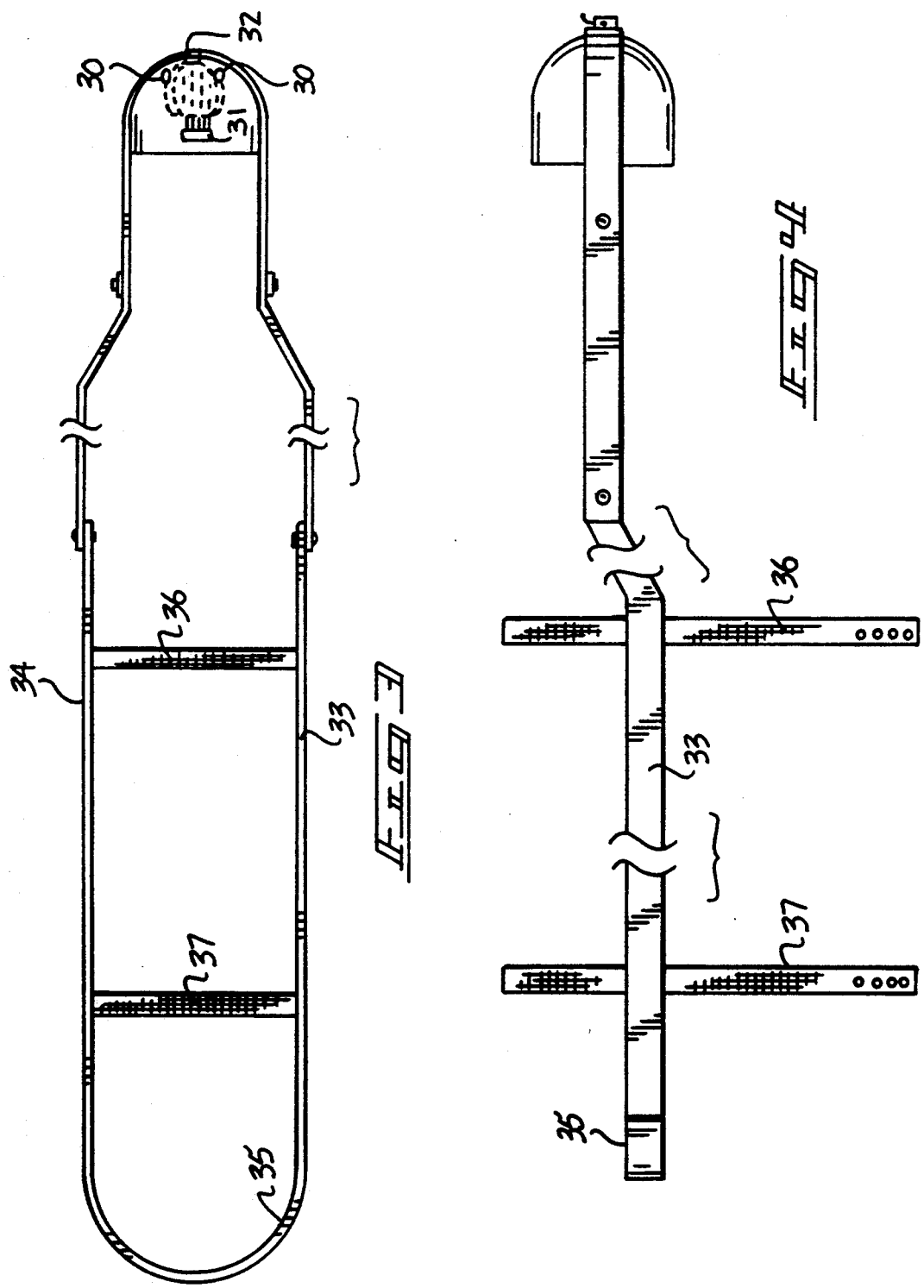

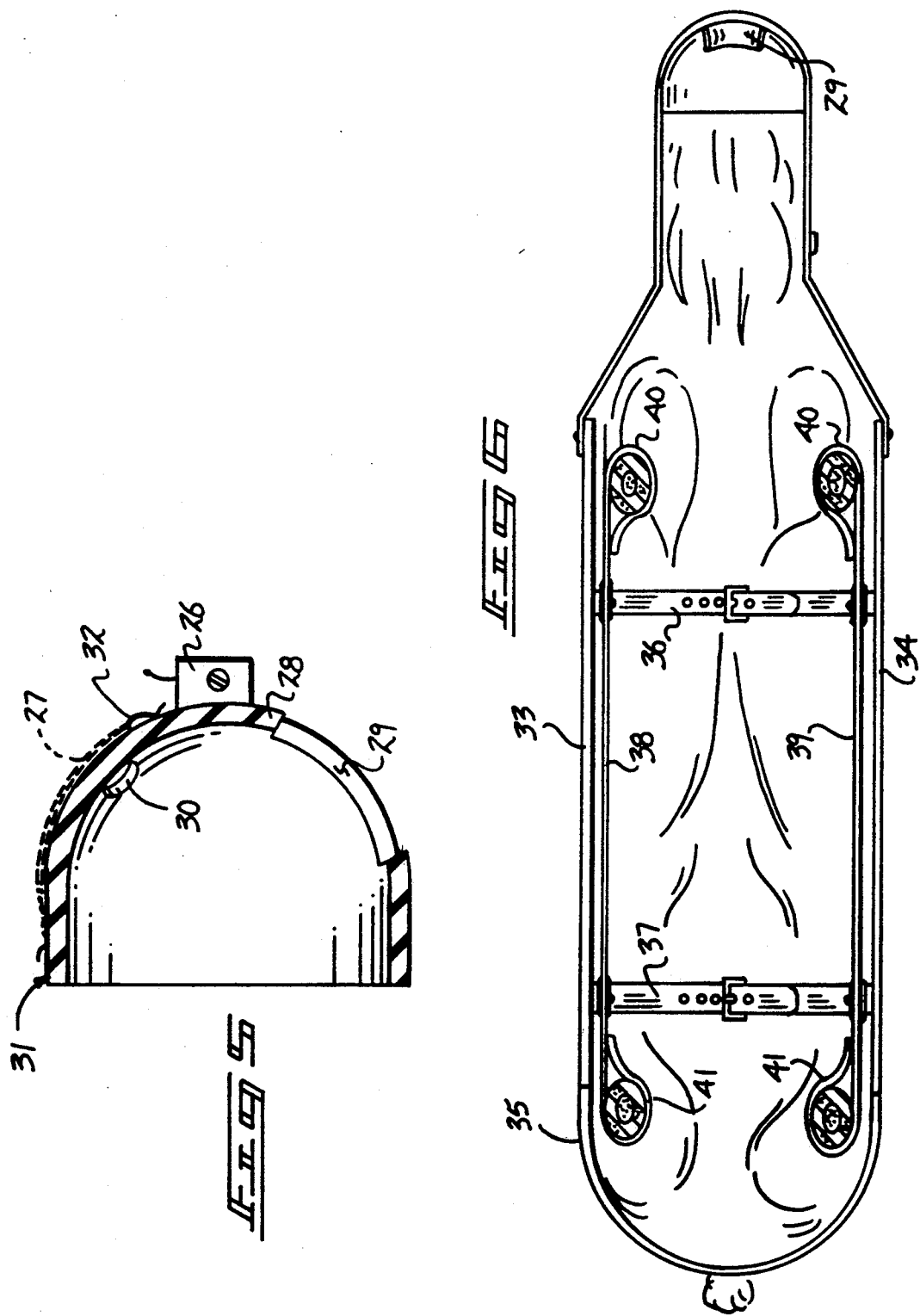

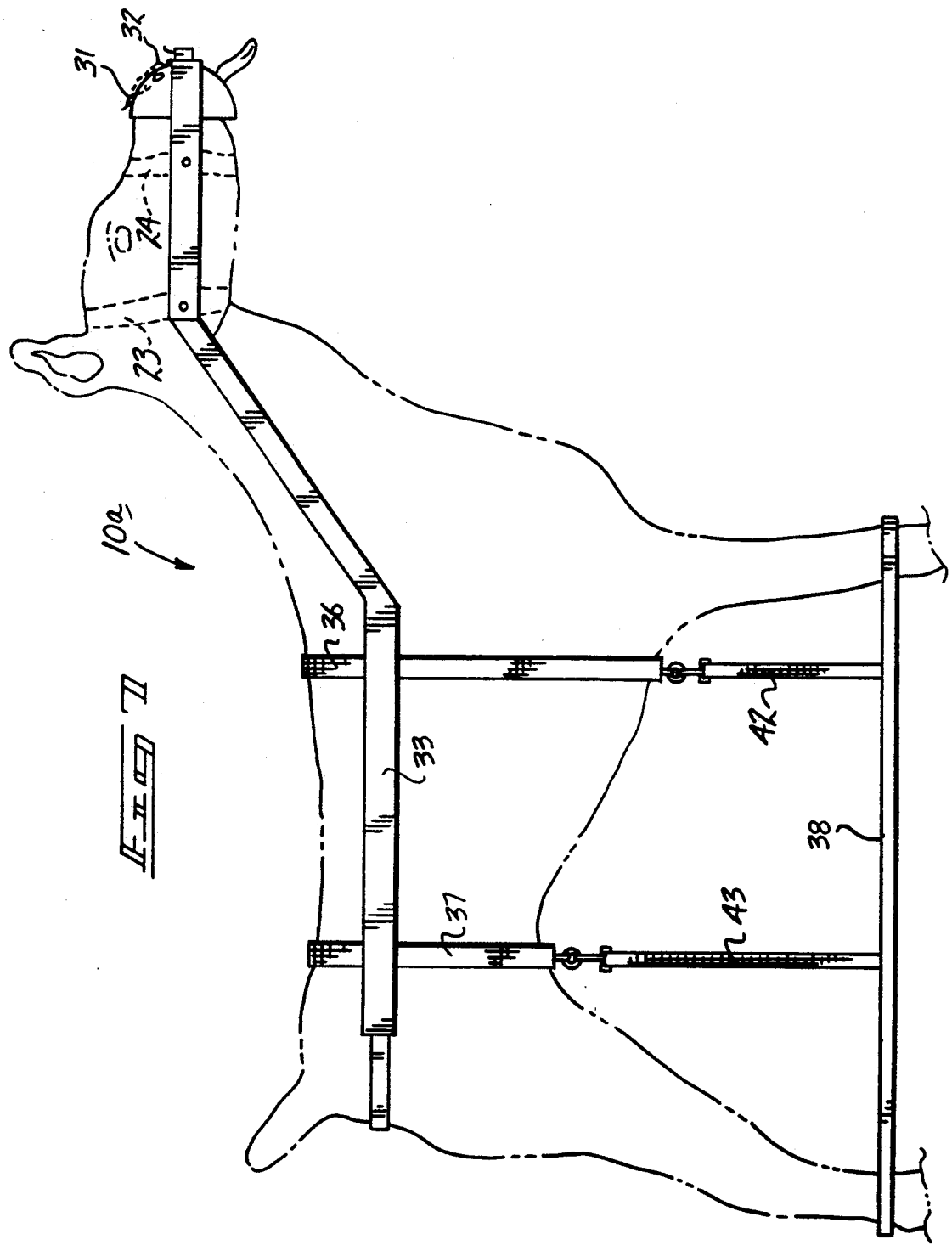

DOG MUZZLE APPARATUS

BACKGROUND OF THE INVENTION

1. Field of the Invention

The field of invention relates to muzzle apparatus, and more particularly pertains to a new and improved dog muzzle apparatus wherein the same is arranged for use in dog racing environments.

2. Description of the Prior Art

Various muzzle apparatus has been utilized in the prior art for securement about a muzzle portion of a canine. Such structure is found for example in U.S. Pat. No. 3,126,869 to Young, et al. wherein a muzzle apparatus is arranged for surrounding securement to an associated muzzle of an associated animal, with a wad of cotton mounted within the muzzle structure for directing a scent to the associated animal.

U.S. Pat. No. 4,252,086 to Schenack utilizes a muzzle of a generally truncated conical configuration for surroundingly securing a dog's muzzle portion in a nonactive manner.

U.S. Pat. No. 4,566,255 to Degroot utilizes a halter structure for encircling a dog's muzzle.

As such, it may be appreciated that there continues to be a need for a new and improved dog muzzle apparatus as set forth by the instant invention which addresses both the problems of ease of use as well as effectiveness in construction in providing inducements in training and racing of dogs and the like.

SUMMARY OF THE INVENTION

In view of the foregoing disadvantages inherent in the known types of muzzle apparatus now present in the prior art, the present invention provides a dog muzzle apparatus wherein the same is secured about a muzzle portion of a racing dog for enhanced excitement in inducing training and racing of dogs. As such, the general purpose of the present invention, which will be described subsequently in greater detail, is to provide a new and improved dog muzzle apparatus which has all the advantages of the prior art muzzle apparatus and none of the disadvantages.

To attain this, the present invention provides a muzzle apparatus arranged for mounting to a muzzle portion of an associated canine, wherein the muzzle apparatus contains an ultra sound receiver, as well as a scent saturated gauze member mounted about the muzzle apparatus to enhance excitement and activity in an associated dog such as utilized in racing. A modification of the invention includes further structure for securing a dog in a limited ambulatory manner.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved dog muzzle apparatus which has all the advantages of the prior art muzzle apparatus and none of the disadvantages.

It is another abject of the present invention to provide a new and improved dog muzzle apparatus which may be easily and efficiently manufactured and marketed.

It is a further object of the present invention to provide a new and improved dog muzzle apparatus which is of a durable and reliable construction.

An even further object of the present invention is to provide a new and improved dog muzzle apparatus which is susceptible of a low cost of manufacture with regard to both materials and labor, and which accordingly is then susceptible of low prices of sale to the consuming public, thereby making such dog muzzle apparatus economically available to the buying public.

Still yet another object of the present invention is to provide a new and improved dog muzzle apparatus which provides in the apparatuses and methods of the prior art some of the advantages thereof, while simultaneously overcoming some of the disadvantages normally associated therewith.

Still another object of the present invention is to provide a new and improved dog muzzle apparatus wherein the same is arranged for selective securement about a dog's muzzle, or alternatively to disable a dog relative to a racing posture.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic top view of a modification of the instant invention.

FIG. 4 is an orthographic side view of the modification of the instant invention.

FIG. 5 is an orthographic cross-sectional configuration of a modified nose guard portion of the muzzle structure as set forth in FIGS. 3 and 4.

FIG. 6 is an orthographic bottom view of the modified muzzle structure mounted to an associated dog member.

FIG. 7 is an orthographic side view of the modified muzzle structure in securement to an associated dog member.

DESCRIPTION OF THE PREFERRED EMBODIMENT

Figure 1:
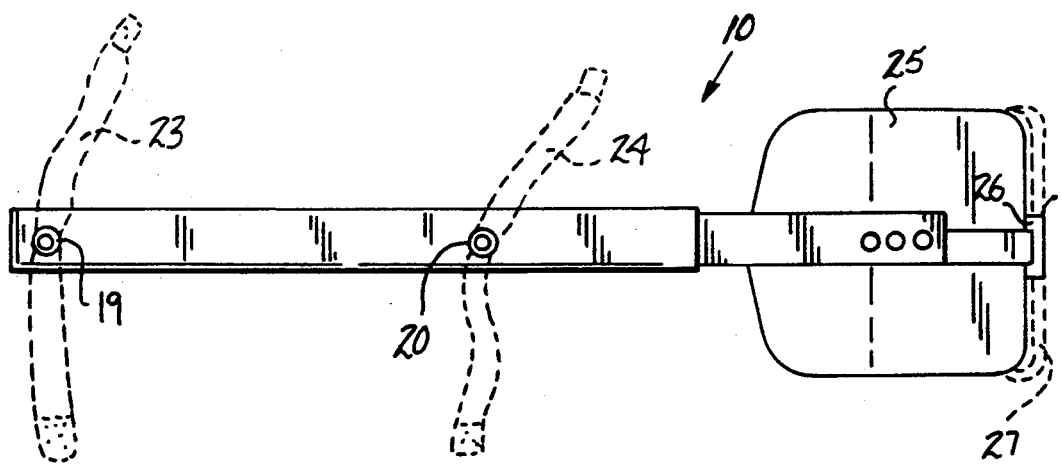
FIG. 1 is an orthographic side view of the instant invention.

With reference now to the drawings, and in particular to FIGS. 1 to 7 thereof, a new and improved dog muzzle apparatus embodying the principles and concepts of the present invention and generally designated by the reference numerals 10 and 10a will be described.

Figure 2:
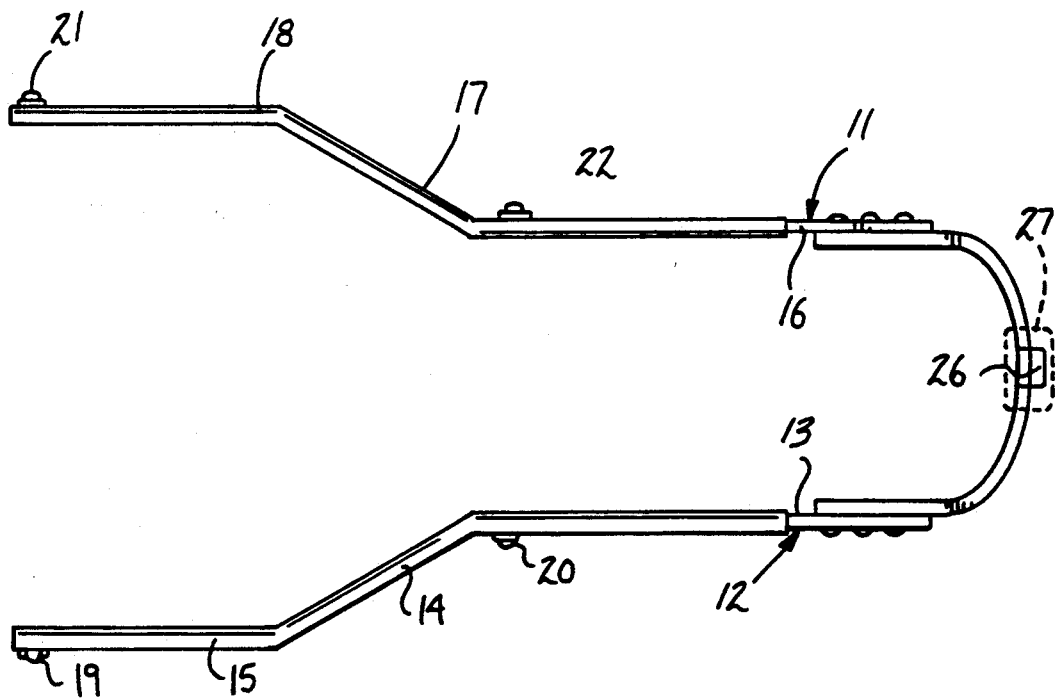
FIG. 2 is an orthographic top view of the instant invention.

More specifically, the dog muzzle apparatus 10 of the instant invention essentially comprises a left rigid strap 11 coextensively with and parallel with a right rigid strap 12. The left and right straps 11 and 12 are of a respectively mirror image serpentine configuration, with the right strap 12 including a right strap first leg 13, a right strap second leg 14, and a right strap third leg 15. The first and third legs 13 and 15 are arranged parallel relative to one another, with the second strap leg 14 defining obtuse angles in connection to the first and third strap legs 13 and 15. Similarly, the left rigid strap 11 includes a left first strap leg 16, a left second strap leg 17, and a left third strap leg 18, with the left first and third legs 16 and 18 oriented parallel offset relative to one another, with the second strap leg 17 defining obtuse angles in communicating connection between the first and third straps 16 and 18. Right and left rear snap fasteners 19 and 21 are mounted to exterior surfaces adjacent rear terminal ends of the respective third strap legs 13 and 18. A right forward fastener 20 and a left forward fastener 22 are mounted to an exterior surface of the respective right first strap leg 13 and the left first strap leg 16 adjacent an intersection of the first strap legs and the second strap legs, as illustrated in FIG. 2 for example. The snap fasteners are arranged for mounting initial configuration rear and forward mounting straps 23 and 24 of flexible configuration utilizing various fastener connections at their terminal ends for securement of the straps about a muzzle portion of a dog. A forward "U" shaped guard shield 25 is mounted to forward terminal ends of the first strap legs 13 and 16, with the "U" shaped guard shield 25 including an ultra sound receiver 26 mounted medially to an exterior surface thereof to receive ultra sound communication to effect training of an individual dog member to permit reception of signals by the ultra sound receiver to enhance training of an individual's dog. Further, an elongate gauze web 27 (see FIGS. 1 and 5) is wound about the forward "U" shaped guard shield 25 in an encircling manner medially between the first strap legs 13 and 16, with the gauze 27 saturated with an animal luring scent.

FIGS. 3-7 illustrate a modified aspect of the invention 10a, wherein the right and left rigid straps 12 and 11 include a respective right and left longitudinal strap 33 and 34 mounted at their forward ends to the respective right and left rear snap fasteners 19 and 21. The longitudinal straps 33 and 34 include a flexible connecting web 35 connecting the rear terminal ends of the right and left straps 33 and 34 together for surroundingly mounting the structure to a rear end portion of a dog member, as illustrated in FIG. 7. A hollow forward shield 28 is mounted to the right and left rigid straps 11 and 12 in lieu of the "U" shaped guard shield 25, wherein the hollow forward shield 28 is formed of resilient polymeric material, with a lower tongue opening 29 directed through a forward end portion of the forward shield to a lower hemisphere of the semi-spherical forward end surface of the forward shield 28. The lower tongue opening 29 is spaced from a plurality of upper nostril openings 30. Positioned above and below the nostril openings 30 are respective first and second clips 31 and 32 that mount the flexible gauze web 27 to overlie the nostril openings for enhanced excitement to an animal when the gauze member is saturated with a predetermined animal scent, such as urine of a rabbit and the like to induce a dog to run at a greater rate during a race environment. A first and second belt 36 and 37 are orthogonally mounted in a spaced relationship relative to the right and left longitudinal straps 33 and 34 for circumferentially surrounding a torso portion of the associated animal, wherein the first and second belts 36 and 37 include right and left lower straps 38 and 39 spaced parallel to and below the respective right and left longitudinal straps 33 and 34. The right and left lower straps 38 and 39 each include a forward and rear leg loop 40 and 41 respectively for receiving an animal's leg through the forward and rear leg loops. A plurality of forward and rear connector straps 42 and 43 are each directed downwardly from the respective forward and rear first and second belts 36 and 37 at their upper ends, and at their lower ends connected to the right and left lower straps 38 and 39 to properly position the right and left lower straps 38 and 39 to the first and second belts 36 and 37 to properly constrain a dog as required prior to or subsequent a race.

It should be noted that the muzzle structure, as illustrated in FIG. 5 for example, permits replacement or servicing of the scented gauze pad without removal of the muzzle structure from an associated animal.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only to the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dog nuzzle apparatus for securement to a dog, wherein the apparatus comprises:
   a left serpentine rigid strap in a mirror image parallel coextensive relationship to a right serpentine rigid strap, and
   the left rigid strap including a left first strap leg, a left second strap leg, and a left third strap leg, the left first strap leg and the left third strap leg connected together by the second strap leg, and wherein the right rigid strap includes a right first strap leg, a right second strap leg, and a right third strap leg, wherein the right first strap leg and the right third strap leg are connected by the right second strap leg, and a right rear snap fastener mounted adjacent a rear terminal end of the right third strap leg, and a left rear snap fastener mounted to an exterior surface of the left third strap leg adjacent a rear terminal end of the left third strap leg, and a rear mounting strap for securement to the right rear snap fastener and the left rear snap fastener permitting securement of the left and right rigid strap in surrounding relationship relative to a head portion of the dog, and a shield member mounted to the left rigid strap and the right rigid strap at a forward terminal end of the left rigid strap and the right rigid strap, and wherein the shield is defined by a semi-spherical forward surface, and the semi-spherical forward surface includes a lower tongue opening and plurality of upper nostril openings, and a first clip mounted to the shield above the upper nostril openings and second clip mounted to the shield below the upper nostril openings, and a scent-soaked gauze web secured to the first clip and the second clip, wherein the gauze web is positioned overlying the upper nostril openings.

2. An apparatus as set forth in claim 1 including an ultra sound receiver mounted to the shield between the upper nostril openings and the lower tongue opening.

3. An apparatus as set forth in claim 2 including a right longitudinal strap mounted to the right rigid strap and a left longitudinal strap mounted to the left rigid strap, wherein the right and left longitudinal straps are arranged to extend coextensively along the dog, with a flexible connecting web mounted to the right and left longitudinal straps remote from the right and left rigid straps for surrounding relationship relative to the dog.

4. An apparatus as set forth in claim 3 wherein the right and left longitudinal straps include a first belt and a second belt orthogonally mounted to the right longitudinal strap and the left longitudinal strap for securement in surrounding relationship relative to a torso portion of the dog, and a forward connector strap pair mounted to the first belt and a rear connector strap pair mounted to the second belt, and a right lower strap positioned below the right longitudinal strap and oriented parallel thereto, and a left lower strap oriented underlying the left longitudinal strap and arranged parallel thereto, with the forward connector strap pair of the first belt mounted to the right lower strap and left lower strap, and the rear connector strap pair of the second belt mounted to the right lower strap and the left lower strap rearwardly of the forward connector strap pair, wherein each of the right and left lower straps includes a forward leg loop and a rear leg loop for receiving a leg member of the dog therethrough.

* * * * *